(12) United States Patent
Kumar et al.

(10) Patent No.: US 12,386,143 B2
(45) Date of Patent: Aug. 12, 2025

(54) MECHANISM FOR DIOPTRIC ADJUSTMENT OF TELESCOPIC LENSES

(71) Applicant: Tonbo Imaging Pte. Ltd., Singapore (SG)

(72) Inventors: Ankit Kumar, Bangalore (IN); Kondangi Lakshmikumar Arvind, Singapore (SG); Nelaji Mohanrao Sudarshan, Bangalore (IN)

(73) Assignee: Tonbo Imaging Pte. Ltd., Singapore (SG)

( * ) Notice: Subject to any disclaimer, the term of this patent is extended or adjusted under 35 U.S.C. 154(b) by 498 days.

(21) Appl. No.: 18/051,387

(22) Filed: Oct. 31, 2022

(65) Prior Publication Data

US 2024/0142745 A1    May 2, 2024

(51) Int. Cl.
| | |
|---|---|
| G02B 7/04 | (2021.01) |
| G02B 7/02 | (2021.01) |
| G02B 23/16 | (2006.01) |
| G02B 25/00 | (2006.01) |

(52) U.S. Cl.
CPC .............. *G02B 7/04* (2013.01); *G02B 7/021* (2013.01); *G02B 7/023* (2013.01); *G02B 23/16* (2013.01); *G02B 25/001* (2013.01)

(58) Field of Classification Search
None
See application file for complete search history.

(56) References Cited

U.S. PATENT DOCUMENTS

2021/0116704 A1*  4/2021  Rivas ................. G02B 27/0006

\* cited by examiner

*Primary Examiner* — Richard H Kim
(74) *Attorney, Agent, or Firm* — Kolisch Hartwell, P.C.

(57) ABSTRACT

The present disclosure provides a device for dioptric adjustment of a plurality of telescopic lenses against a focal plane array. The device includes a hollow cylinder developed onto a housing. In addition, the housing includes a plurality of pins. The device includes the focal plane array affixed with a support structure. Further, the device includes a barrel body. The barrel body includes a plurality of slots. Further, each of the plurality of pins is inserted in a slot of the plurality of slots of the barrel body. Furthermore, the device includes a dioptric adjusting knob coupled to the plurality of telescopic lenses with facilitation of the barrel body. Furthermore, the dioptric adjusting knob is manually rotatable about a longitudinal axis of the barrel body for displacing the plurality of telescopic lenses to thereby adjust an optical setting of the spotting scope.

20 Claims, 8 Drawing Sheets

MECHANISM FOR DIOPTRIC ADJUSTMENT OF TELESCOPIC LENSES

TECHNICAL FIELD

The present invention relates to telescopic lenses and, in particular, to a mechanism for dioptric adjustment of telescopic lenses.

BACKGROUND

Dioptric adjustment permits for fine-tuning of a device to focus according to a user's eyes. The process is critical to ensure that both the image on a focusing screen and a device display are in perfect focus. In addition, the dioptric adjustment ensures calibration of an optical device with respect to changing visual insight of the user's eyes. It is the device of a single lens to deliver well-matched focus when the user's eyes have changing visual insight. The outcome is less strain on the eyes that permits for best visual, depth and contrast focusing when composing a picture or viewing a target through a device made of lenses or lens elements. On the contrary, and while speaking about infrared optical devices, since the eye cannot sense infrared radiation, infrared sensing systems require sensor arrays such as focal plane arrays. In an example, CCD cameras. These focal plane arrays are straight-lined, with the focal plane array located at the focal plane of the corresponding telescopic element. After an infrared monocular is correctly attuned for the user's eye, it is significant the same be possible for any other user, probably with dissimilar visual insight.

In light of the above-stated discussion, there is a need for a device which overcomes the above-stated shortcomings.

SUMMARY

In an aspect, the present disclosure includes a device for dioptric adjustment of a plurality of telescopic lenses against a focal plane array. The device includes a hollow cylinder. In addition, the device includes the focal plane array affixed with a support structure. Further, the device includes a barrel body. The barrel body includes a plurality of slots. Furthermore, the device includes a dioptric adjusting knob coupled to a plurality of telescopic lenses with facilitation of the barrel body. The hollow cylinder is developed onto a housing. The housing includes a plurality of pins. The plurality of pins is formed onto the housing. The plurality of pins restricts rotational movement of the barrel body. The each of the plurality of pins is inserted in a slot of the plurality of slots of the barrel body. In addition, the support structure is rigidly affixed inside the hollow cylinder of the housing. Further, the barrel body encapsulates the plurality of telescopic lenses. The barrel body is able to slide inside the hollow cylinder developed onto the housing. The barrel body and the plurality of telescopic lenses can move in forward and backward direction. Furthermore, the dioptric adjusting knob is manually rotatable about a longitudinal axis of the barrel body for displacing the plurality of telescopic lenses to thereby adjust an optical setting of the spotting scope. The dioptric adjusting knob is restricted to move axially with the facilitation of the plurality of pins. Moreover, the device enables dioptric adjustment of the plurality of telescopic lenses against the focal plane array without causing skew or distortion of view.

In an embodiment of the present disclosure, the barrel body includes male threading machined onto the barrel body.

In an embodiment of the present disclosure, the device includes a plurality of spacer. In addition, the plurality of spacer facilitates appropriate distance between the plurality of telescopic lenses.

In an embodiment of the present disclosure, each telescopic lens in the plurality of telescopic lenses having fixed distance with respect to each other.

In an embodiment of the present disclosure, the dioptric adjusting knob includes female threading. In addition, the female threading engages with the male threading. Further, the movement of the plurality of telescopic lenses in response to rotation of the dioptric adjusting knob changes a focus setting of the spotting scope.

In an embodiment of the present disclosure, the focal plane array receives an optical axis. In addition, the optical axis is absolutely coaxial with the longitudinal axis of the barrel body. Further, the longitudinal axis of the barrel body passes through the center of the barrel body.

In an embodiment of the present disclosure, the device includes a plurality of disk. In addition, the plurality disk is positioned onto the housing in a fixed position. Further, the plurality of disk locks the barrel body into position.

In an embodiment of the present disclosure, the plurality of pins and the plurality of slots collectively enable limits of dioptric adjustment. In addition, the limits includes minimum and maximum number of diopters.

In an embodiment of the present disclosure, the device includes a plurality of O-rings positioned between the housing and the barrel body. Further, the O-rings facilitates isolation of the device from an outer environment.

In an embodiment of the present disclosure, the device includes an eye cup connected onto an eyepiece. In addition, the eye cup is assembled with the facilitation of a spring wire clip. Further, the eyepiece facilitates to see the view projected onto the focal plane array.

In another aspect, the present disclosure includes a device for dioptric adjustment of a plurality of telescopic lenses against a focal plane array. The device includes a hollow cylinder developed onto a housing. In addition, the device includes the focal plane array affixed with a support structure. Further, the device includes a barrel body. The barrel body includes a plurality of slots. Furthermore, the device includes a plurality of disk positioned onto the housing in a fixed position. Moreover, the device includes a dioptric adjusting knob coupled to the plurality of telescopic lenses with facilitation of the barrel body. In addition, the housing includes a plurality of pins formed onto the housing. Further, the support structure is rigidly affixed inside the hollow cylinder of the housing. Furthermore, the plurality of pins restricts rotational movement of the barrel body. The each of the plurality of pins is inserted in a slot of the plurality of slots of the barrel body. The barrel body encapsulates a plurality of telescopic lenses. The plurality of pins and the plurality of slots collectively enable limits of dioptric adjustment. The limits having minimum and maximum number of diopters. Moreover, the barrel body is able to slide inside the hollow cylinder developed onto the housing. The barrel body and the plurality of telescopic lenses can move in forward and backward direction. Also, the plurality of disk locks the barrel body into position. Also, the dioptric adjusting knob is manually rotatable about a longitudinal axis of the barrel body for displacing the plurality of telescopic lenses to thereby adjust an optical setting of the spotting scope. The dioptric adjusting knob is restricted to move axially with the facilitation of the plurality of pins. The device enables dioptric adjustment of the plurality of telescopic lenses against the focal plane array without causing skew or distortion of view.

In an embodiment of the present disclosure, the barrel body includes male threading machined onto the barrel body.

In an embodiment of the present disclosure, the device includes a plurality of spacer. In addition, the plurality of spacer facilitates appropriate distance between the plurality of telescopic lenses.

In an embodiment of the present disclosure, each telescopic lens in the plurality of telescopic lenses having fixed distance with respect to each other.

In an embodiment of the present disclosure, the dioptric adjusting knob includes female threading. In addition, the female threading engages with the male threading. Further, the movement of the plurality of telescopic lenses in response to rotation of the dioptric adjusting knob changes a focus setting of the spotting scope.

In an embodiment of the present disclosure, the focal plane array receives an optical axis. In addition, the optical axis is absolutely coaxial with the longitudinal axis of the barrel body. Further, the longitudinal axis of the barrel body passes through the center of the barrel body.

In an embodiment of the present disclosure, the device includes a plurality of O-rings positioned between the housing and the barrel body. In addition, the O-rings facilitates isolation of the device from an outer environment.

In an embodiment of the present disclosure, the device includes an eye cup connected onto an eyepiece. In addition, the eye cup is assembled with the facilitation of a spring wire clip. Further, the eyepiece facilitates to see the view projected onto the focal plane array.

In yet another aspect, the present disclosure includes a plurality of telescopic lenses against a focal plane array. The device includes a hollow cylinder. In addition, the device includes a focal plane array affixed with a support structure. Further, the device includes a barrel body. The barrel body includes a plurality of slots. Furthermore, the device includes a plurality of O-rings positioned between the housing and the barrel body. Moreover, the device includes a plurality of disk positioned onto the housing in a fixed position. Also, the device includes a dioptric adjusting knob coupled to the plurality of telescopic lenses with facilitation of the barrel body. In addition, the hollow cylinder is developed onto a housing. The housing includes a plurality of pins formed onto the housing. Further, the support structure is rigidly affixed inside the hollow cylinder of the housing. Furthermore, the plurality of pins restricts rotational movement of the barrel body. The each of the plurality of pins is inserted in a slot of the plurality of slots of the barrel body. The barrel body includes male threading machined onto the barrel body. The barrel body encapsulates a plurality of telescopic lenses. Moreover, the plurality of pins and the plurality of slots collectively enable limits of dioptric adjustment. The limits include minimum and maximum number of diopters. Also, the barrel body is able to slide inside the hollow cylinder developed onto the housing. The barrel body and the plurality of telescopic lenses can move in forward and backward direction. The focal plane array receives an optical axis. The optical axis is absolutely coaxial with a longitudinal axis of the barrel body. The longitudinal axis of the barrel body passes through the center of the barrel body. Also, the O-rings provides isolation of the device from an outer environment. Also, the plurality of disk locks the barrel body into position. Also, the dioptric adjusting knob is manually rotatable about the longitudinal axis of the barrel body for displacing the plurality of telescopic lenses to thereby adjust an optical setting of the spotting scope. The dioptric adjusting knob is restricted to move axially with the facilitation of the plurality of pins. The dioptric adjusting knob includes female threading. The female threading engages with the male threading. Also, the movement of the plurality of telescopic lenses in response to rotation of the dioptric adjusting knob changes a focus setting of the spotting scope. The device enables dioptric adjustment of the plurality of telescopic lenses against a focal plane array without causing skew or distortion of view.

In an embodiment of the present disclosure, the device includes a plurality of spacer. In addition, the plurality of spacer facilitates appropriate distance between the plurality of telescopic lenses.

BRIEF DESCRIPTION OF THE FIGURES

Having thus described the disclosure in general terms, reference will now be made to the accompanying figures, wherein;

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1A:
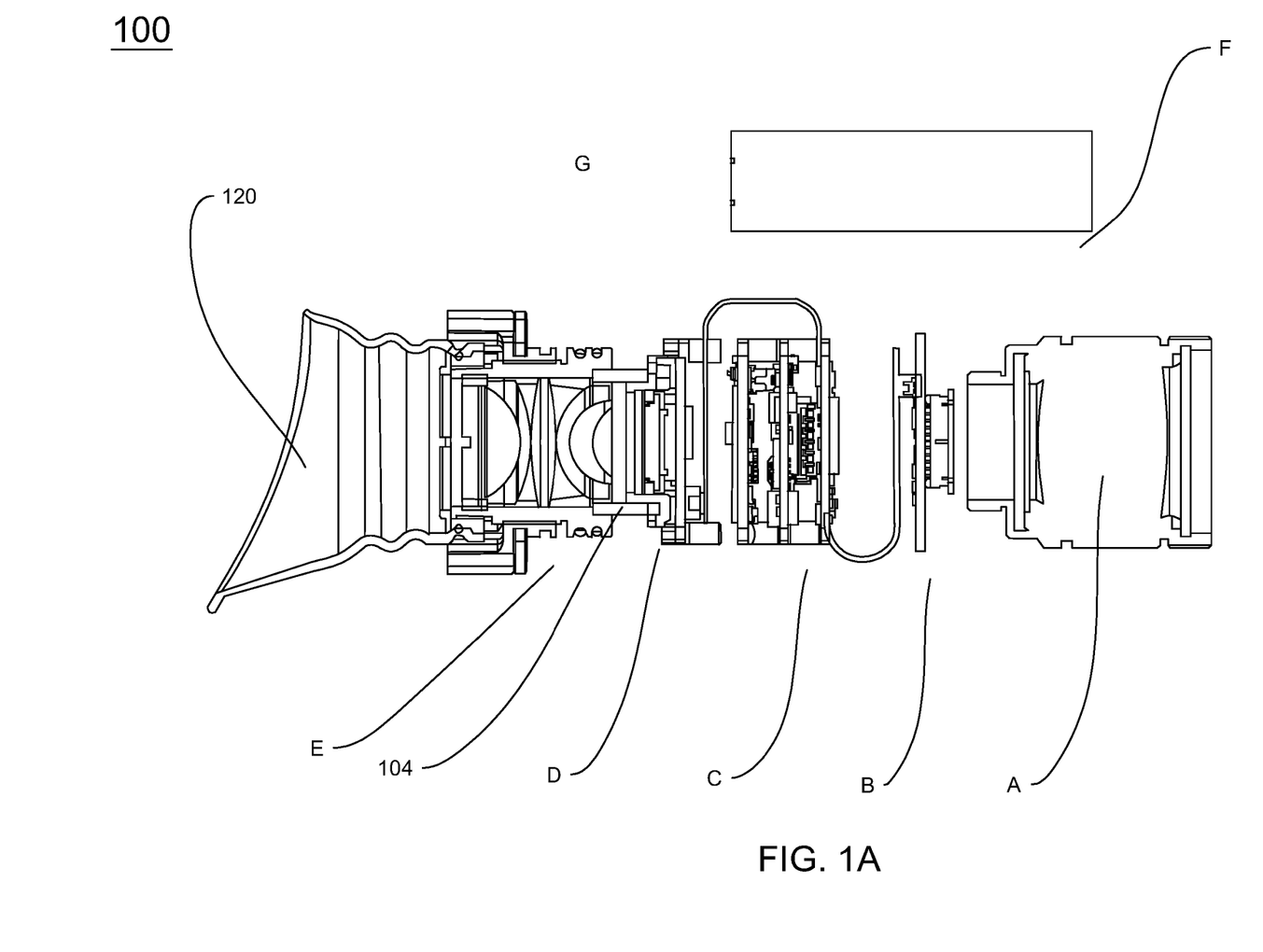
FIG. 1A illustrates an environment of a device, in accordance with an embodiment of the present disclosure.
Figure 1B:
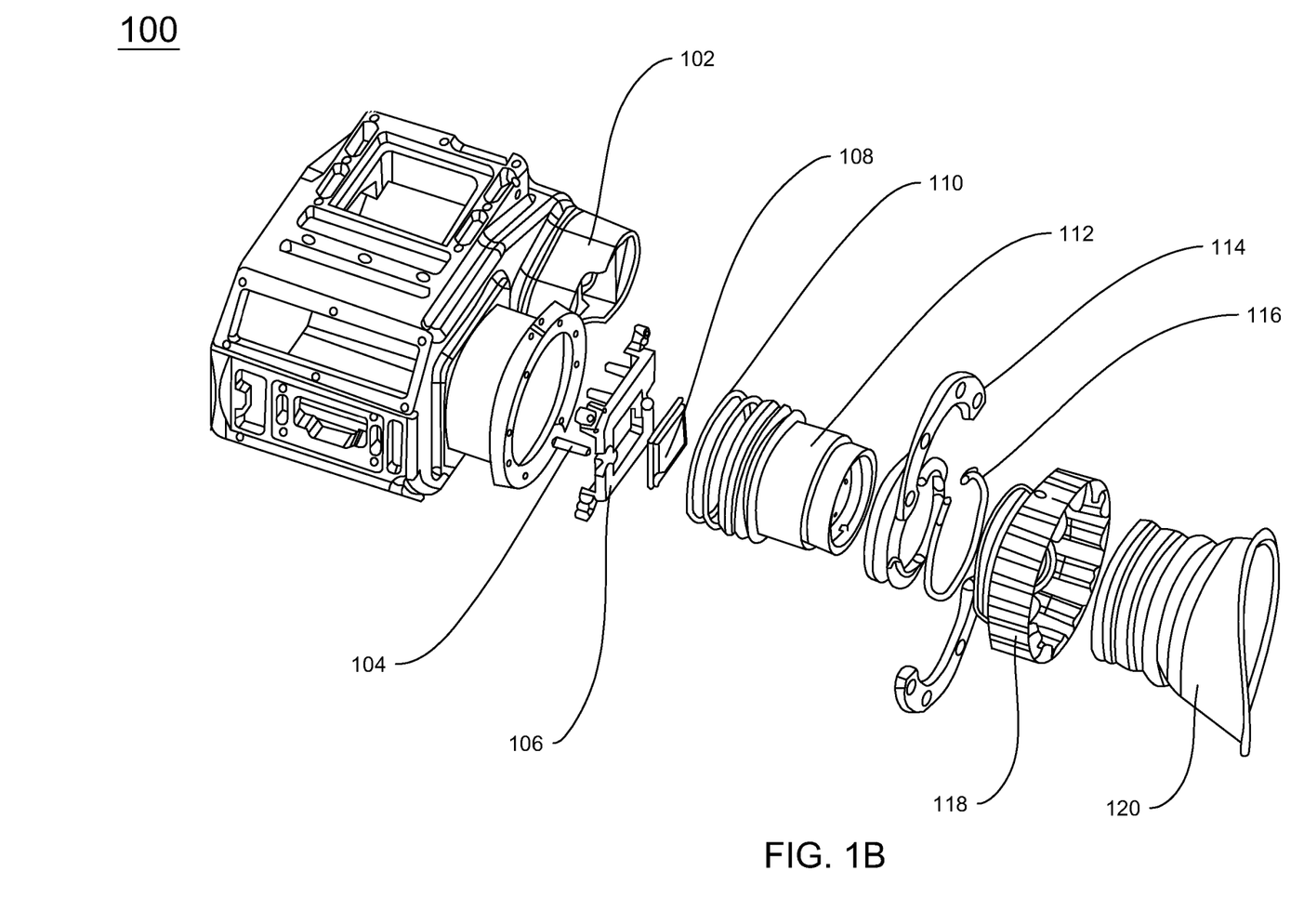
FIG. 1B illustrates a detailed exploded view of the device, in accordance with various embodiments of the present disclosure.
Figure 1C:
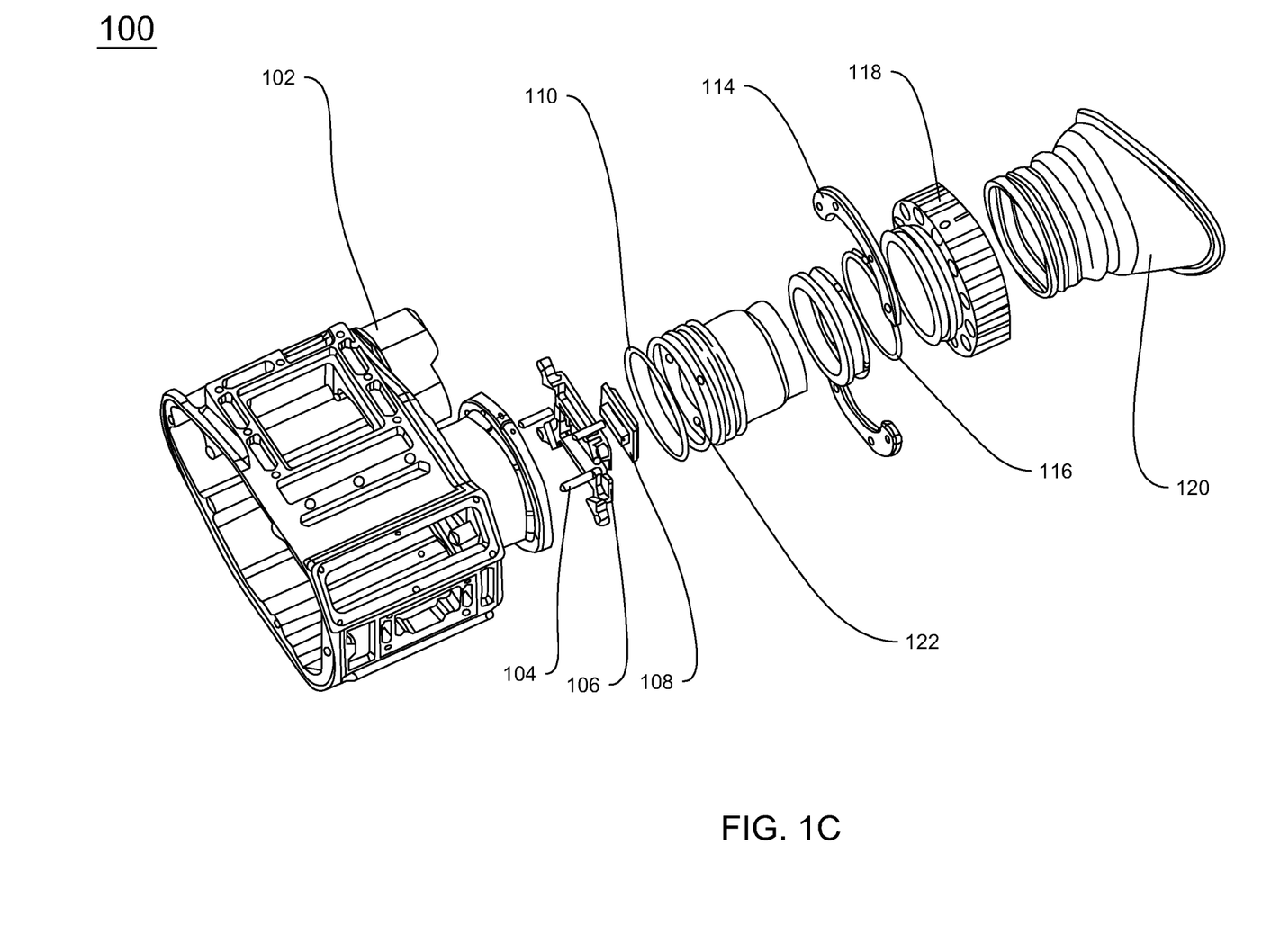
FIG. 1C illustrates the detailed exploded view of the device from a different perspective angle, in accordance with various embodiments of the present disclosure.
Figure 2A:
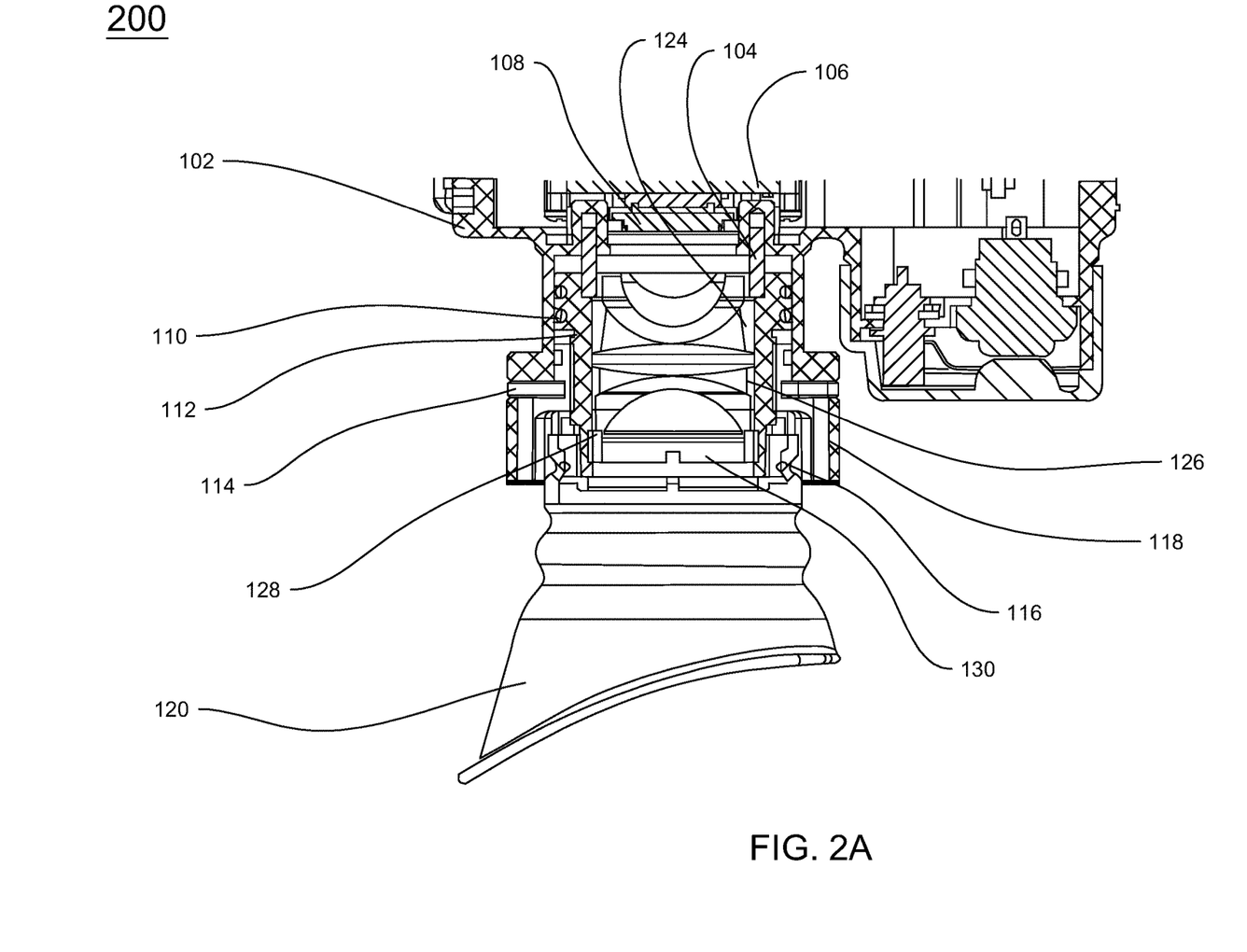
FIG. 2A illustrates a horizontal cut away view of the device, in accordance with various embodiments of the present disclosure.
Figure 2B:
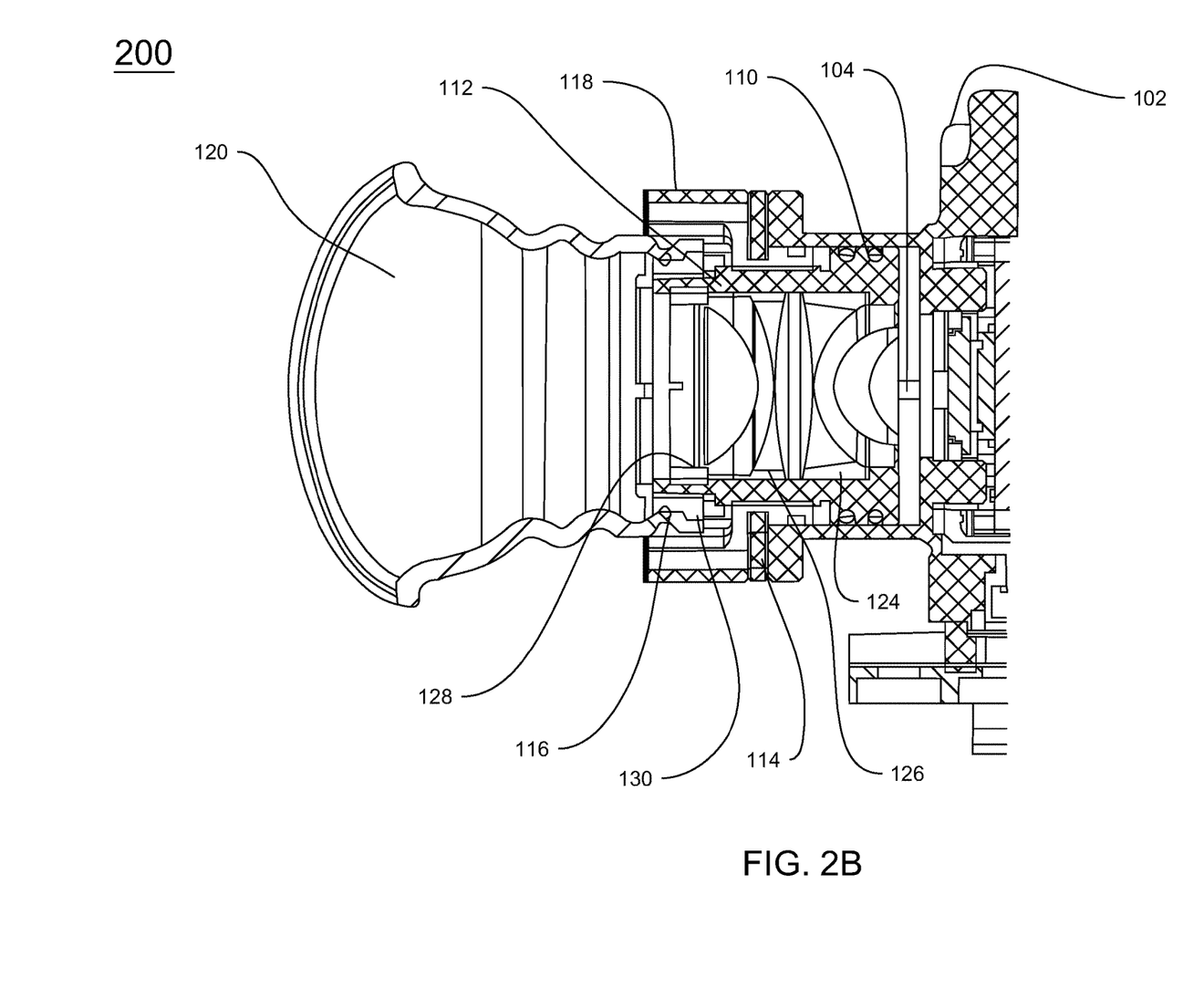
FIG. 2B illustrates a vertical cut away view of the device, in accordance with various embodiments of the present disclosure.
Figure 2C:
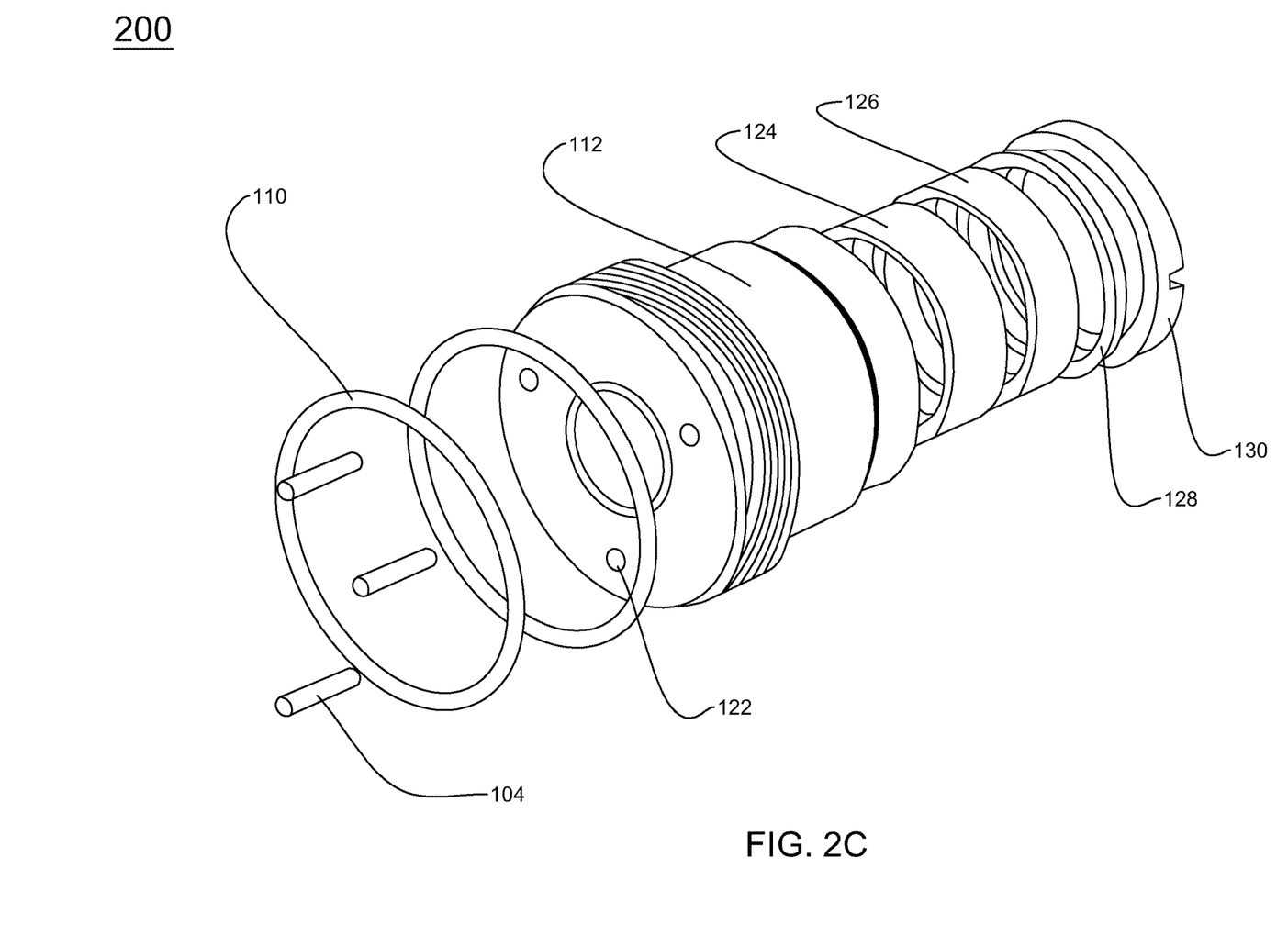
FIG. 2C illustrates a detailed exploded view of a plurality of telescopic lenses of the device, in accordance with an embodiment of the present disclosure.
Figure 2D:
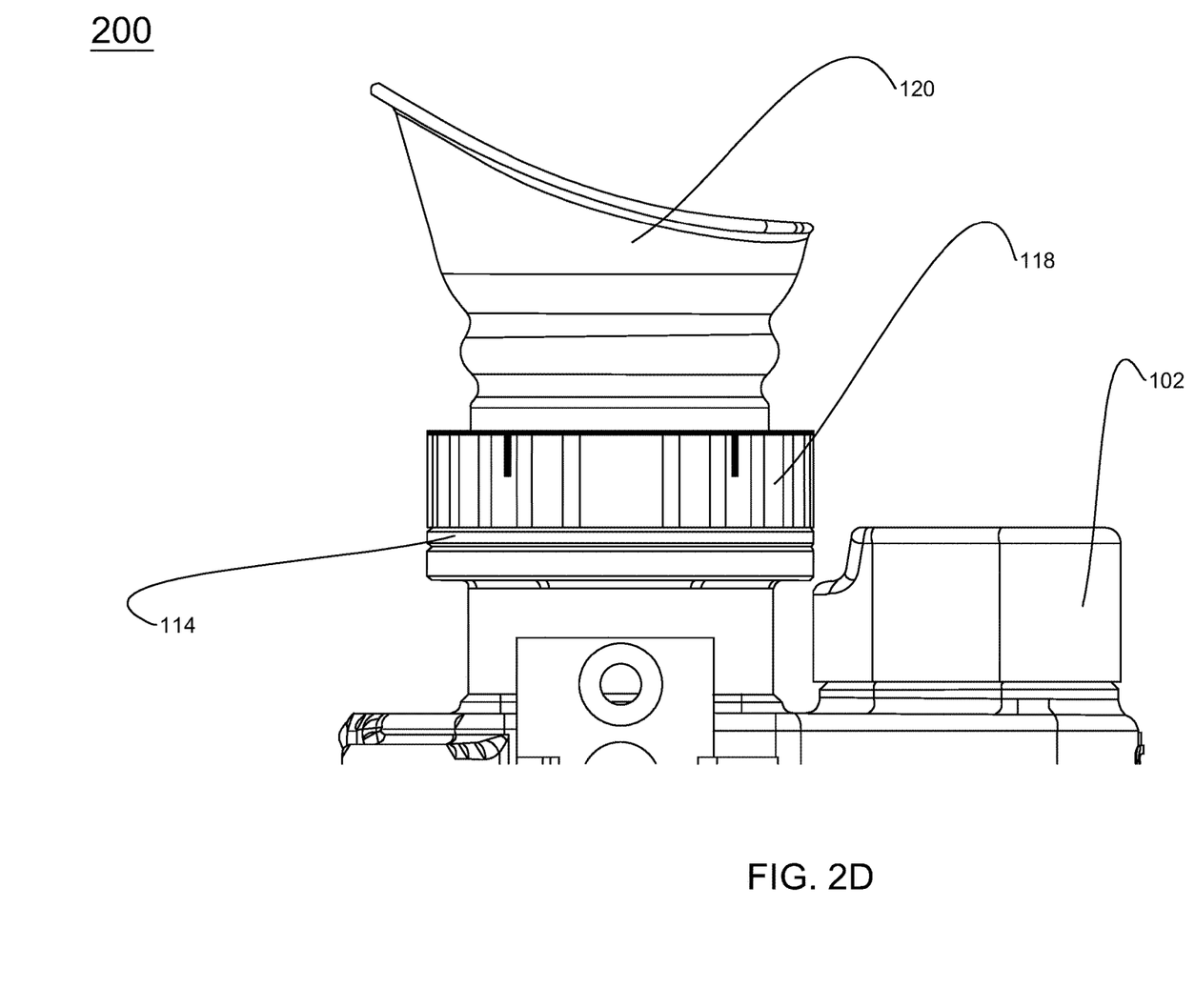
FIG. 2D illustrates a view from a top of the device, in accordance with various embodiments of the present disclosure.
Figure 2E:
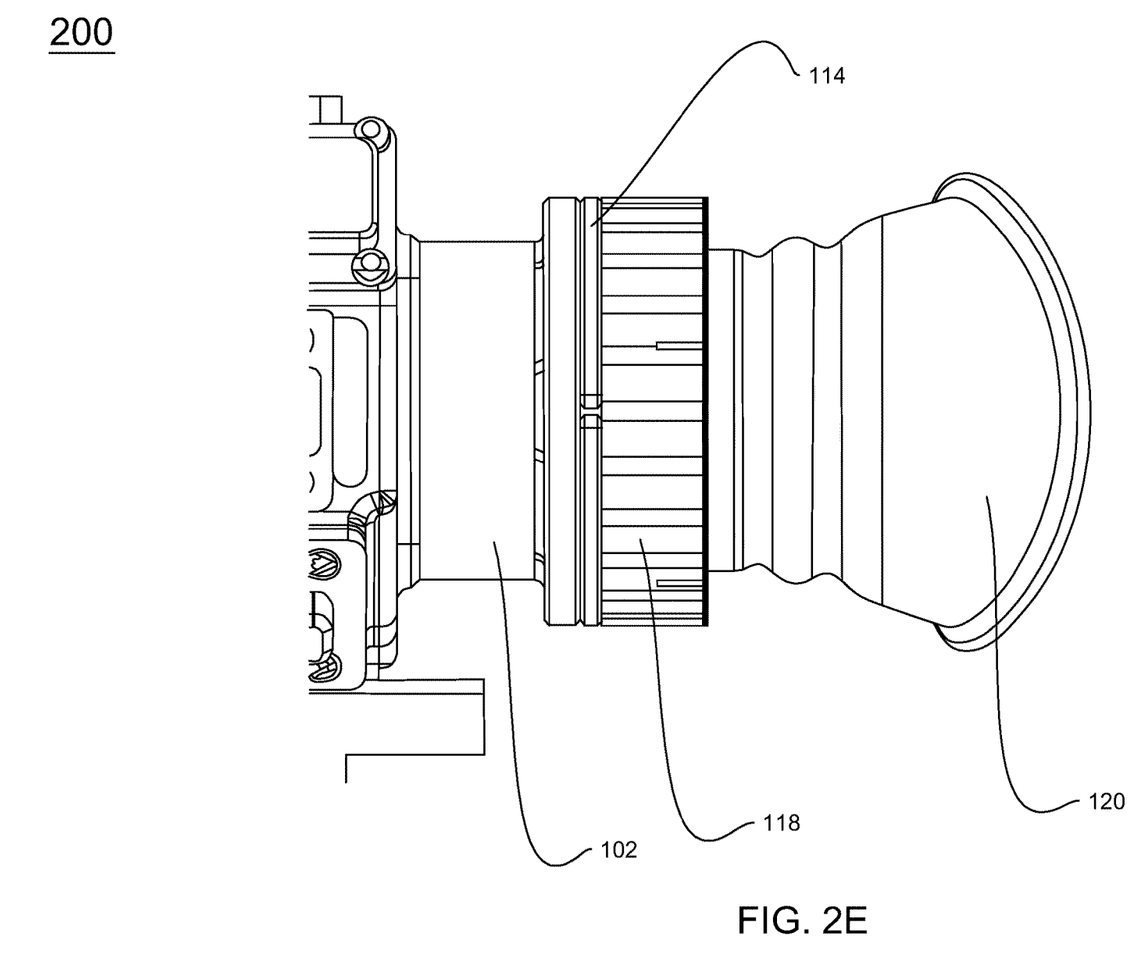
FIG. 2E illustrates a side view of the device, in accordance with various embodiments of the present disclosure.

FIG. 1A illustrates an environment of a device 100, in accordance with an embodiment of the present disclosure. FIG. 1B illustrates a detailed exploded view of the device 100, in accordance with various embodiments of the present disclosure. FIG. 1C illustrates the detailed exploded view of the device 100 from different perspective angle, in accordance with various embodiments of the present disclosure. FIG. 2A illustrates a horizontal cut away view of the device 100, in accordance with various embodiments of the present disclosure. FIG. 2B illustrates a vertical cut away view of the device 100, in accordance with various embodiments of the present disclosure. FIG. 2C illustrates a detailed exploded view of a plurality of telescopic lenses of the device 100, in accordance with various embodiments of the present disclosure. FIG. 2D illustrates a view from a top of the device 100, in accordance with various embodiments of the present disclosure. FIG. 2E illustrates a side view of the device 100, in accordance with various embodiments of the present disclosure.

The device 100 includes a housing 102, a plurality of pins 104, a support structure 106, a focal plane array 108, a plurality of O-rings 110 and a barrel body 112. In addition, the device 100 includes a plurality of disks 114, a spring wire clip 116, a dioptric adjusting knob 118, an eye cup 120, a plurality of slots 122, a first spacer 124, a second spacer 126, a face sealing gasket 128 and a nut 130.

In an embodiment of the present disclosure, the device 100 corresponds to a device for dioptric adjustment of a plurality of telescopic lenses against the focal plane array 108. In general, focal plane array refers to a sensing device, consisting of an array of light-sensing pixels at a focal plane of a lens that is sensitive to infrared radiation. The focal plane is the plane that is perpendicular to the axis of a lens or mirror and passes through the focal point. The focal plane array 108 operates by converting infrared photons to an electrical signal, and using it to construct an image of the sample. In another embodiment of the present disclosure, the focal plane array 108 includes an optical axis. The optical axis is coaxial with a longitudinal axis of the barrel body 112. In general, longitudinal axis refers to the lengthwise direction of the figure or body, usually passing through its center of gravity. In yet another embodiment of the present disclosure, the longitudinal axis of the barrel body 112 passes through the center of the barrel body 112. In yet another embodiment of the present disclosure, the distance between the plurality of telescopic lenses of the device 100 against the focal plane array 108 is adjusted to make the device 100 suitable for use by different individuals with different visual acuity. The adjustment of distance between the plurality of telescopic lenses of the device 100 against the focal plane array 108 is termed as dioptric adjustment or dioptric correction. In general, dioptric correction refers to the expression for the adjustment of the optical instrument to the varying visual acuity of a person's eyes. It is the adjustment of one lens to provide compatible focus when the viewer's eyes have differing visual capabilities.

The device 100 enables the dioptric adjustment of the plurality of telescopic lenses against the focal plane array 108 without causing skew or distortion of view. In general, skew corresponds to slanting or misalignment of images formed on the focal plane of an imaging system. The device 100 enables the dioptric adjustment of the plurality of telescopic lenses against the focal plane array 108 without causing any distortion in the image.

The environment of the device 100 as shown in FIG. 1A includes a plurality of sections. The plurality of sections includes section A, section B, section C, section D, section E, section F, and section G. The section A includes a plurality of infrared lenses that trough an appropriate field of view (hereinafter, FOV) and collects the emitted thermal energy from the outside environment under observation. In general, FOV refers to open observable area up to which a person can see through his or her eyes with an optical device. The optical device includes but not limited to camera, video sensing device, night vision device, thermal vision device, monocular, binocular, and the like. In case of optical devices, FOV describes angle through which devices can pick up electromagnetic radiations. In an embodiment of the present disclosure, the section B includes a thermal sensor. In general, thermal sensor refers to a device, which is used for measurement of temperature or heat, such as Resistance temperature detectors (RTD), thermocouple, thermistor, sensistor, and the like. In another embodiment of the present disclosure, the plurality of infrared lenses of the section A inside the device 100 focuses onto the thermal sensor of the section B.

In an embodiment of the present disclosure, the thermal sensor of the section B transmits electrical signals to the section C. The section C includes a processing unit. The processing unit receives the electrical signals form the section B. The processing unit processes the received signals using specific algorithms and performs very fast image processing calculations to compose video streams that are directed towards the focal plane array 108 inscribed in the section D. The focal plane array 108 is mounted over a stack of PCBs that form the main processing unit.

In an embodiment of the present disclosure, the section E includes a monocular carrying the main mechanism for the dioptric adjustment. In addition, the section F is the power unit of the device 100. The power unit provides power to the various components of the device 100 to perform their intended functions. In another embodiment of the present disclosure, the power unit is battery powered. The battery can be of any type including Li-ion battery, Li-polymer battery, Nickel cadmium, and the like. Further, the section G is the housing 102 or a rigid shell of the device 100 that isolates the components located inside out of the external environment. The section G is filled with gasses like nitrogen, helium, krypton, and the like for the purpose of purging. In general, purging is carried out to avoid the possibility of an explosive air/gas mixture existing or forming in consumer piping, appliances or confined spaces. In an example, purging extends tolerable range of external temperature, external pressure, varying humidity levels, and the like. The neutral nature of the inert gas is most suitable for purging.

The device 100 includes the housing 102. In general, housing refers to a body, exterior case, rigid shell or enclosure used to protect an interior mechanism, including integrated fittings or brackets to keep internal components in place. The housing prevents the interior mechanism from being fouled by outside debris or to contain the internal components. Housing may be the body of the device. In an embodiment of the present disclosure, the device 100 includes a hollow cylindrical intrusion. The hollow cylindrical intrusion is developed onto the housing 102. The hollow cylindrical intrusion is perfectly cylindrical from inner diameter. In an embodiment of the present disclosure, the hollow cylindrical intrusion can be of any shape. In an embodiment of the present disclosure, the housing 102 is made up of a suitable material. In an example, the suitable material may include but not limited to aluminum, alloy, metal, rubber, glass, wood, plastic and the like.

The plurality of pins 104 is formed onto the housing 102. In an embodiment of the present disclosure, the plurality of pins 104 includes a first pin, a second pin, and a third pin. In another embodiment of the present disclosure, the plurality of pins 104 can be of any number. In an example, the plurality of pins 104 is made of suitable material that can be similar to the housing 102 material or may be different.

The focal plane array 108 is affixed with the support structure 106. In addition, the focal plane array 108 and the support structure 106 are being supported rigidly over the stack of the PCBs that undertake the signal processing. The support structure 106 is rigidly affixed inside the housing 102. In an embodiment of the present disclosure, the support structure 106 is rigidly affixed inside the hollow cylindrical intrusion of the housing 102. The support structure 106 provides mechanical support to the focal plane array 108 of the device 100. In general, support structure corresponds to rigid structural element to provide mechanical support to various elements of an assembly. Also, the support structure can hold and support any device. The support structure provides a framework and mechanical support for all the machine components. In addition, the support structure encompasses important components such as the machine base, column, worktable, slide, spindle cases, carriages, and the like. In an example, when a person tries to displace the device 100, the focal plane array 108 stays affixed in a position with the help of the support structure 106.

The device 100 includes the barrel body 112. The barrel body 112 is a hollow body and has a cylindrical cross-section. The barrel body 112 includes a male threading. In general, male threading is considered as external threads. The external threads are of different shapes like U-shape, V-shape, and the like. The external threads are of two types, right-hand side external threads and left-hand side external threads. The male threading is machined onto the barrel body 112. The barrel body 112 inserts into the housing 102 and can slide inside the housing 102. In an embodiment of the present disclosure, the barrel body 112 inserts into the hollow cylindrical intrusion of the housing 102 and can slide inside the hollow cylindrical intrusion of the housing 102. The barrel body 112 always has an outer diameter smaller than the inner diameter of the housing 102.

In addition, the barrel body 112 includes the plurality of slots 122. In general, slot corresponds to a narrow opening or a slit in a body for receiving one or more components. In other words, hole corresponds to a circular recess or cavity in a body. Further, the barrel body 112 encapsulates the plurality of telescopic lenses. In an embodiment of the present disclosure, the plurality of telescopic lenses is steadily fixed with the barrel body 112 and coaxial with the optical axis of the focal plane array 108. In general, telescopic lenses is referred as a lens that appears to magnify distant objects. To do that, the telescopic lenses need to have a focal length longer than that of a normal lens, or a lens that approximates the optical qualities of the human eye. In another embodiment of the present disclosure, each telescopic lens in the plurality of telescopic lenses holds fixed distance with respect to each other. The nut 130 fixes the plurality of telescopic lenses into position inside the barrel body 112.

In an embodiment of the present disclosure, the device 100 includes the plurality of O-rings 110. In general, O-ring is referred to as gasket or seal in the form of a ring with a circular cross section, which is typically made of rubber and used especially in swiveling joints. The plurality of O-rings 110 is positioned between the housing 102 and the barrel body 112. The plurality of O-rings 110 facilitates isolation of the device 100 from an outer environment. In addition, the plurality of O-rings 110 seals the plurality of telescopic lenses and the focal plane array 108 from the outside environment, against dust and humidity. Further, the face sealing gasket 128 is included along with the plurality of O-rings 110 as an additional measure of sealing the device 100 from the outside environment.

In an embodiment of the present disclosure, the device 100 includes a plurality of spacers. The plurality of spacers includes the first spacer 124 and the second spacer 126. In general, spacer is referred to as a device or structure that is used to provide distance between two parts or devices. In another embodiment of the present disclosure, the plurality of spacer can be of any number. The first spacer 124 and the second spacer 126 collectively facilitate appropriate distance between the plurality of telescopic lenses. In an example, the spacers are generally used in optical instruments to get an appropriate distance to have sharp focus of an object. In addition, the device 100 includes the plurality of disks 114. The plurality of disks 114 includes a first disk and a second disk. In an embodiment of the present disclosure, the plurality of disks 114 may include any number of disks. The plurality of disks 114 is positioned onto the housing 102 in a fixed position. The plurality of disks 114 locks the barrel body 112 into position.

In an embodiment of the present disclosure, the device 100 includes the dioptric adjusting knob 118. The dioptric adjusting knob 118 is coupled to the plurality of telescopic lenses with facilitation of the barrel body 112. In an embodiment of the present disclosure, the dioptric adjusting knob 118 is manually rotatable about the longitudinal axis of the barrel body 112 for displacing the plurality of telescopic lenses to thereby, adjust an optical setting of the telescopic lens. In another embodiment of the present disclosure, the dioptric adjusting knob 118 is restricted to move axially with the facilitation of the plurality of pins 104. The dioptric adjusting knob 118 includes a female threading. In general, female threading is considered as internal threads. The internal threads are of different shapes like U-shape, V-shape, and the like. The internal threads are of two types, right-hand side external threads and left-hand side external threads. The female threading of the dioptric adjusting knob 118 engages with the male threading of the barrel body 112. The engagement of the threading locks the barrel body 112 into position with the facilitation of the plurality of disks 114. In addition, the rotation of the dioptric adjusting knob 118 attempts to rotate the barrel body 112 through the engagement of the threading. Accordingly, the plurality of pins 104 restricts the barrel body 112 to rotate. Further, the movement of the plurality of telescopic lenses in response to rotation of the dioptric adjusting knob 118 alters focus setting of the spotting scope. Furthermore, the engagement of the threaded connection has very low coefficient of performance (hereinafter, COP), during the reverse action of the dioptric adjusting knob 118 a self-locking is achieved. The self-locking of the dioptric adjusting knob 118 prevents from image distortion due to accidently change in diopter.

In an embodiment of the present disclosure, the plurality of pins 104 along with the plurality of slots 122 ensure movement of the plurality of telescopic lenses against the focal plane array 108. A pin of the plurality of pins 104 is inserted in a corresponding slot of the plurality of slots 122 of the barrel body 112. The plurality of pins 104 along with the plurality of slots 122 restricts rotational movement of the barrel body 112. The plurality of pins 104 along with the plurality of slots 122 enables the movement of the plurality of telescopic lenses along a straight horizontal line. The straight-line movement of the plurality of telescopic lenses results in elimination of skew or distortion in images formed on the focal plane. The device 100 enables a user for dioptric adjustment. In addition, the plurality of pins 104 and the plurality of slots 122 collectively enable limits of dioptric adjustment. The limits of dioptric adjustment incorporate minimum and maximum number of diopters. In general, diopter refers to is a unit of measurement of the optical power of a lens or curved mirror, which is equal to the reciprocal of the focal length measured in meters. For example, a 3-dioptre lens brings parallel rays of light to focus at ⅓ meter. In another example, a flat window has an optical power of zero diopter, and does not converge or diverge light. In another embodiment of the present disclosure, the device 100 enables the user to temporarily lock the distance between the plurality of telescopic lenses and the focal plane array 108. The device 100 enables users to lock the plurality of telescopic lenses and the focal plane array 108 at desired position. The device 100 enables symmetrical movement of the plurality of telescopic lenses. The device 100 eliminates skew or distortion caused by the dioptric adjustment.

In an embodiment of the present disclosure, the user is an entity that has authority to use the device 100. In addition, the user is any person who performs the dioptric adjustment. In another embodiment of the present disclosure, the user is any person who handles operation of the device 100. In yet another embodiment of the present disclosure, the user is any person who performs maintenance of the device 100. In yet another embodiment of the present disclosure, the user is any person that has knowledge to operate the device 100.

The device 100 includes an eyepiece. The eyepiece is mounted on telescopic element. In general, eyepiece correspond to a component that is closest to the eyes of the user when someone is looking through the imaging device. In addition, the device 100 includes the eye cup 120. In general, eye cups on monocular or binoculars are the 'rings' that are situated around the ocular as it were. The eye cups can be made from silicon, which makes them flexible and easy to fold back, or from hard plastic. The eye cup 120 is connected onto the eyepiece and assembled with the facilitation of the spring wire clip 116. The eyepiece facilitates to see the view projected onto the focal plane array 108. The eye cup 120 forms a substantial seal around the user's eye to restrict leakage of light. Further, the eye cup 120 used can be of two types; open type eye cup and closed type eye cup. The open type eye cup provides a constant opening for the eye to see through. The closed type eye cup provides shutters that open while the area around the eye is pressing the eye cup 120 axially, opening this way the shutters and allowing the eye to see through the plurality of telescopic lenses.

The invention has been successfully incorporated so far, in more advanced imaging systems and thermal imagers containing a number of various sensors such as, thermal cameras, daylight cameras, focal plane arrays, laser range finders, and laser illuminators. In an embodiment of the present disclosure, the plurality of imaging systems includes any suitable imaging systems of the like. The device 100 provides satisfactory testing results for all different configurations.

The device 100 enables dioptric adjustment by rotating the dioptric adjustment knob 118 in desired direction without applying any additional leverage. The dioptric adjustment of the device 100 is easily adjusted by applying force with hands of the user. The device 100 adjusts the dioptric adjustment such that orientation of the focal plane array 108 is always parallel to the barrel body 112. The device 100 enables movement of the plurality of telescopic lenses with respect to the focal plane array 108. The device 100 does not rotate or distort the imagery. Further, the device 100 provides smooth operation throughout travel of the plurality of telescopic lenses. In an embodiment the present disclosure, the device 100 is designed to meet needs of thermal infrared (IR) imaging; however, it is applicable to other viewing systems.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed:

1. A device for dioptric adjustment of a plurality of telescopic lenses, the device comprising:
   a housing, wherein the housing comprises a plurality of pins, wherein the plurality of pins is formed onto the housing;
   a focal plane array, wherein the focal plane array is affixed with a support structure, wherein the support structure is rigidly affixed inside the housing;
   a barrel body, wherein the barrel body comprises a plurality of slots, wherein the plurality of pins restricts rotational movement of the barrel body, wherein a pin of the plurality of pins is inserted in a corresponding slot of the plurality of slots of the barrel body, wherein the barrel body encapsulates the plurality of telescopic lenses, wherein the barrel body slides inside the housing, wherein the barrel body and the plurality of telescopic lenses move in forward and backward direction; and a dioptric adjusting knob, wherein the dioptric adjusting knob is coupled to the plurality of telescopic lenses with facilitation of the barrel body, wherein the dioptric adjusting knob is manually rotatable about a longitudinal axis of the barrel body for displacing the plurality of telescopic lenses to adjust an optical setting of the plurality of telescopic lenses, wherein the dioptric adjusting knob is restricted to move axially with facilitation of the plurality of pins, wherein the device enables the dioptric adjustment of the plurality of telescopic lenses against the focal plane array without causing skew or distortion of view.

2. The device as recited in claim 1, wherein the barrel body comprises male threading, wherein the male threading is machined onto the barrel body.

3. The device as recited in claim 1, further comprising a plurality of spacers, wherein the plurality of spacers facilitate appropriate distance between the plurality of telescopic lenses.

4. The device as recited in claim 1, wherein each telescopic lens of the plurality of telescopic lenses has a fixed distance with respect to each other.

5. The device as recited in claim 1, wherein the dioptric adjusting knob comprises a female threading, wherein the female threading engages with a male threading of the barrel body, wherein a movement of the plurality of telescopic lenses in response to rotation of the dioptric adjusting knob changes a focus setting of the plurality of telescopic lenses.

6. The device as recited in claim 1, wherein an optical axis of the focal plane array is coaxial with the longitudinal axis of the barrel body, wherein the longitudinal axis of the barrel body passes through a center of the barrel body.

7. The device as recited in claim 1, further comprising a plurality of disks, wherein the plurality disks is positioned onto the housing in fixed position, wherein the plurality of disks locks the barrel body into position.

8. The device as recited in claim 1, wherein the plurality of pins and the plurality of slots collectively enable limits of the dioptric adjustment, wherein the limits comprises a minimum and a maximum number of diopters.

9. The device as recited in claim 1, further comprising a plurality of O-rings positioned between the housing and the barrel body, wherein the plurality of O-rings facilitates isolation of the device from an outer environment.

10. The device as recited in claim 1, further comprising an eye cup, wherein the eye cup is connected onto an eyepiece, wherein the eye cup is assembled with facilitation of a spring wire clip, wherein the eyepiece facilitates to see a view projected onto the focal plane array.

11. The device as recited in claim 1, further comprising an eye cup, wherein the eye cup is connected onto an eyepiece, wherein the eye cup is assembled with facilitation of a spring wire clip, wherein the eyepiece facilitates to see a view projected onto the focal plane array.

12. A device for dioptric adjustment of a plurality of telescopic lenses, the device comprising:

a housing, wherein the housing comprises a plurality of pins, wherein the plurality of pins is formed onto the housing;

a focal plane array, wherein the focal plane array is affixed with a support structure, wherein the support structure is rigidly affixed inside the housing;

a barrel body, wherein the barrel body comprises a plurality of slots, wherein the plurality of pins restricts rotational movement of the barrel body, wherein a pin of the plurality of pins is inserted in a corresponding slot of the plurality of slots of the barrel body, wherein the barrel body encapsulates the plurality of telescopic lenses, wherein the barrel body slides inside the housing, wherein the barrel body and the plurality of telescopic lenses move in forward and backward direction;

a plurality of disks, wherein the plurality disk is positioned onto the housing in fixed position, wherein the plurality of disks lock the barrel body into position; and a dioptric adjusting knob, wherein the dioptric adjusting knob is coupled to the plurality of telescopic lenses with facilitation of the barrel body, wherein the dioptric adjusting knob is manually rotatable about a longitudinal axis of the barrel body for displacing the plurality of telescopic lenses to adjust an optical setting of the plurality of telescopic lenses, wherein the dioptric adjusting knob is restricted to move axially with facilitation of the plurality of pins, wherein the device enables the dioptric adjustment of the plurality of telescopic lenses against the focal plane array without causing skew or distortion of view.

13. The device as recited in claim 12, wherein the barrel body comprises male threading, wherein the male threading is machined onto the barrel body.

14. The device as recited in claim 12, further comprising a plurality of spacers, wherein the plurality of spacers facilitate appropriate distance between the plurality of telescopic lenses.

15. The device as recited in claim 12, wherein each telescopic lens of the plurality of telescopic lenses has a fixed distance with respect to each other.

16. The device as recited in claim 12, wherein the dioptric adjusting knob comprises a female threading, wherein the female threading engages with a male threading of the barrel body, wherein a movement of the plurality of telescopic lenses in response to rotation of the dioptric adjusting knob changes a focus setting of the plurality of telescopic lenses.

17. The device as recited in claim 12, wherein an optical axis of the focal plane array is coaxial with the longitudinal axis of the barrel body, wherein the longitudinal axis of the barrel body passes through a center of the barrel body.

18. The device as recited in claim 12, wherein the plurality of pins and the plurality of slots collectively enable limits of the dioptric adjustment, wherein the limits comprises a minimum and a maximum number of diopters.

19. The device as recited in claim 12, further comprising a plurality of O-rings positioned between the housing and the barrel body, wherein the plurality of O-rings facilitates isolation of the device from an outer environment.

20. A device for dioptric adjustment of a plurality of telescopic lenses, the device comprising:

a housing, wherein the housing comprises a plurality of pins, wherein the plurality of pins is formed onto the housing;

a focal plane array, wherein the focal plane array is affixed with a support structure, wherein the support structure is rigidly affixed inside the housing;

a barrel body, wherein the barrel body comprises a plurality of slots, wherein the plurality of pins restricts rotational movement of the barrel body, wherein a pin of the plurality of pins is inserted in a corresponding slot of the plurality of slots of the barrel body, wherein the barrel body encapsulates the plurality of telescopic lenses, wherein the barrel body slides inside the housing, wherein the barrel body and the plurality of telescopic lenses move in forward and backward direction, wherein an optical axis of the focal plane array is coaxial with the longitudinal axis of the barrel body, wherein the longitudinal axis of the barrel body passes through a center of the barrel body;

a plurality of O-rings positioned between the housing and the barrel body, wherein the plurality of O-rings facilitates isolation of the device from an outer environment;

a plurality of disks, wherein the plurality disk is positioned onto the housing in fixed position, wherein the plurality of disks lock the barrel body into position; and a dioptric adjusting knob, wherein the dioptric adjusting knob is coupled to the plurality of telescopic lenses with facilitation of the barrel body, wherein the dioptric adjusting knob is manually rotatable about a longitudinal axis of the barrel body for displacing the plurality of telescopic lenses to adjust an optical setting of the plurality of telescopic lenses, wherein the dioptric adjusting knob is restricted to move axially with facilitation of the plurality of pins, wherein the device enables the dioptric adjustment of the plurality of telescopic lenses against the focal plane array without causing skew or distortion of view.

* * * * *